May 16, 1933.  R. V. KAIMER  1,909,361
LATCH FOR AUTOMOBILE DOORS
Filed Jan. 23, 1928   6 Sheets-Sheet 1
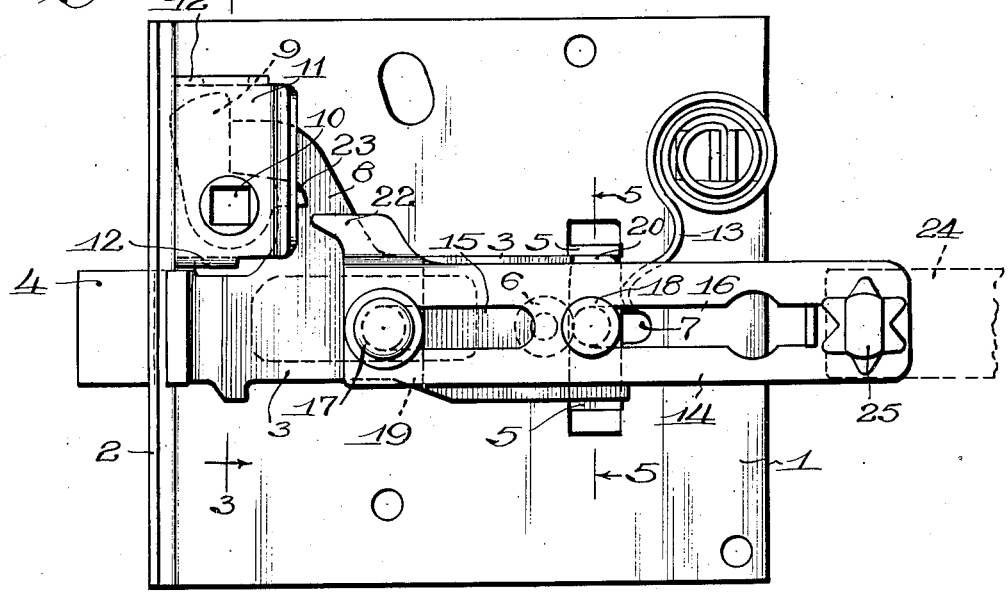
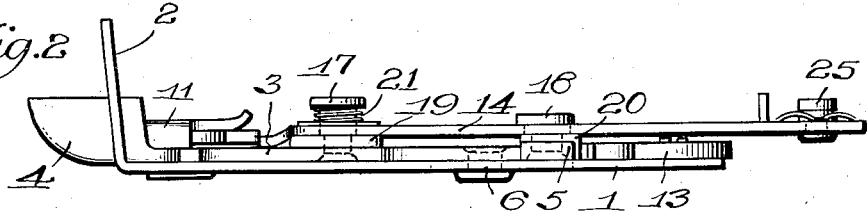
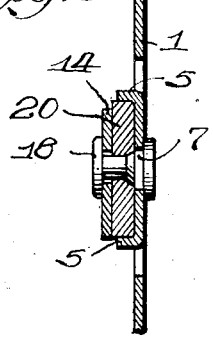
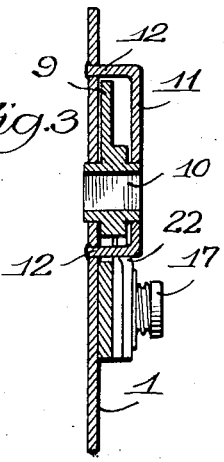
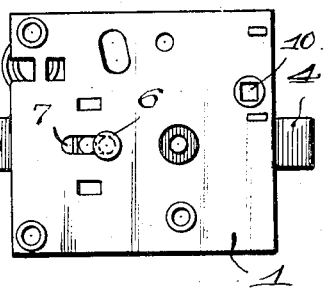
Witness:
Chas. R. Koursh
Inventor,
Richard V. Kaimer,
George Bayard Jones, Atty.

May 16, 1933.  R. V. KAIMER  1,909,361
LATCH FOR AUTOMOBILE DOORS
Filed Jan. 23, 1928   6 Sheets-Sheet 2
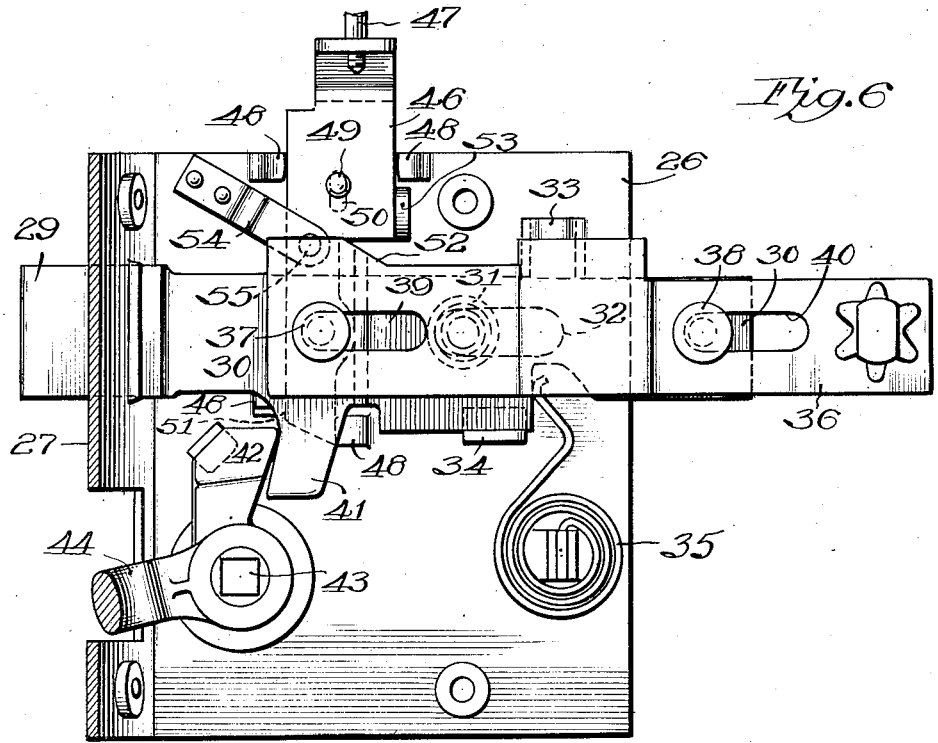
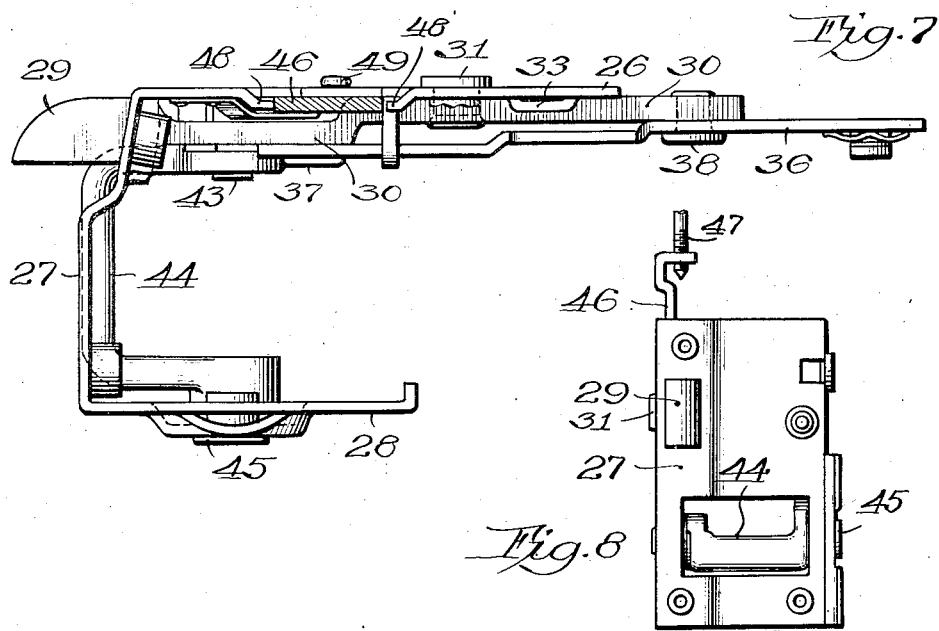

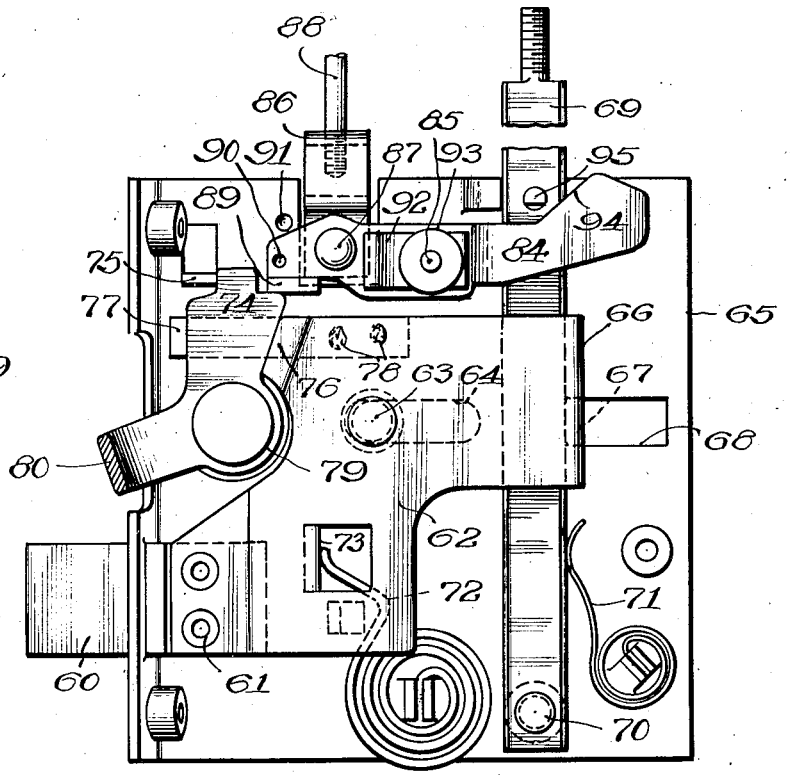
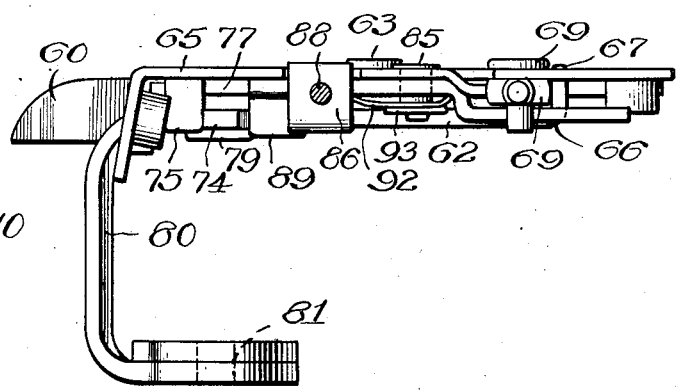
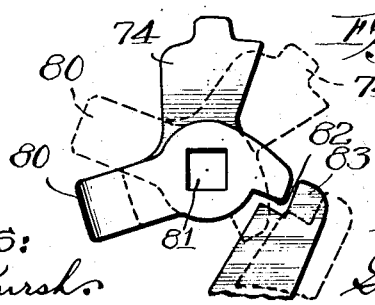

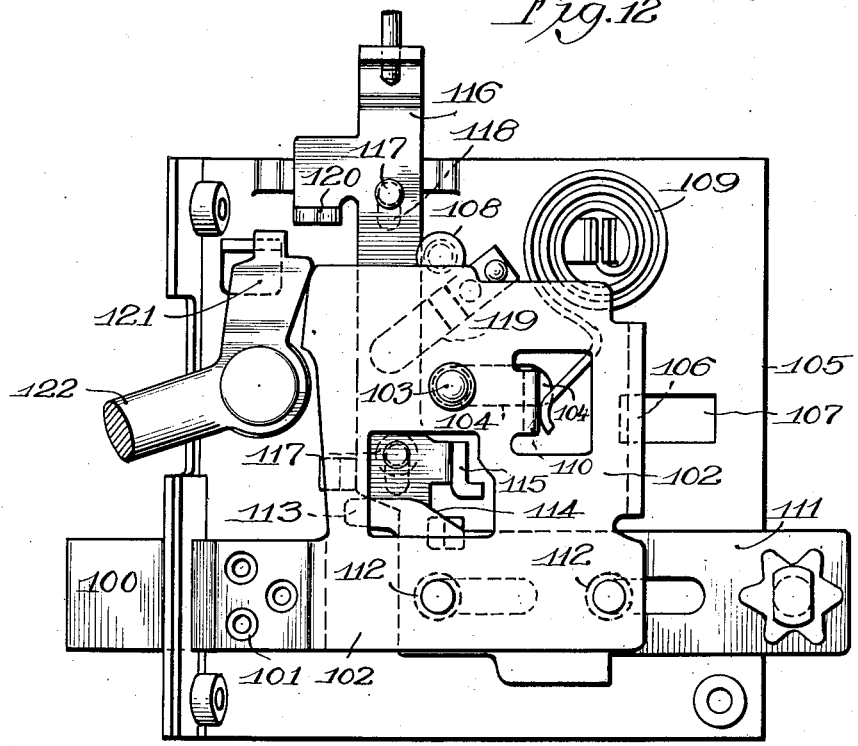
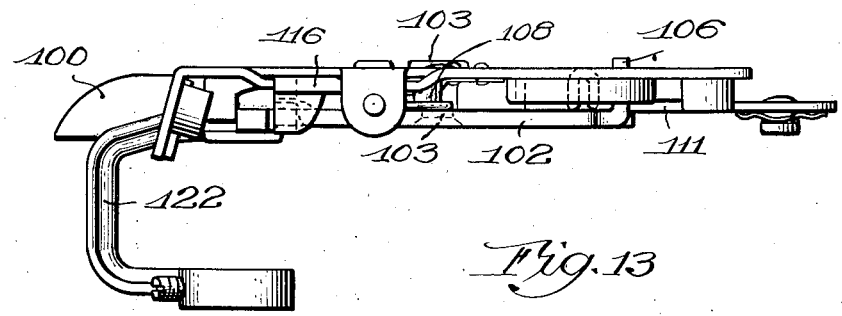

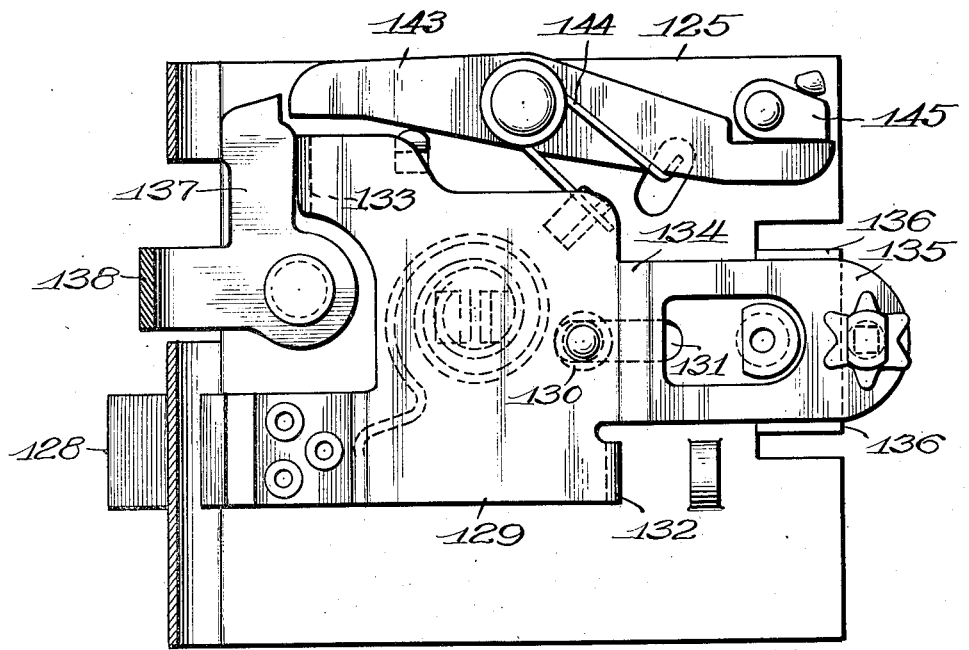
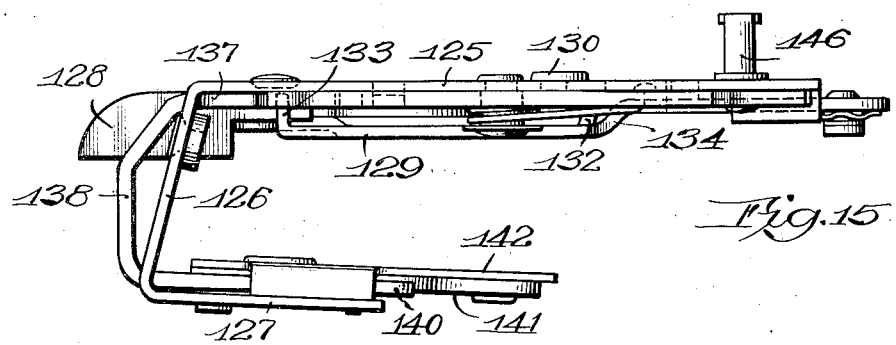
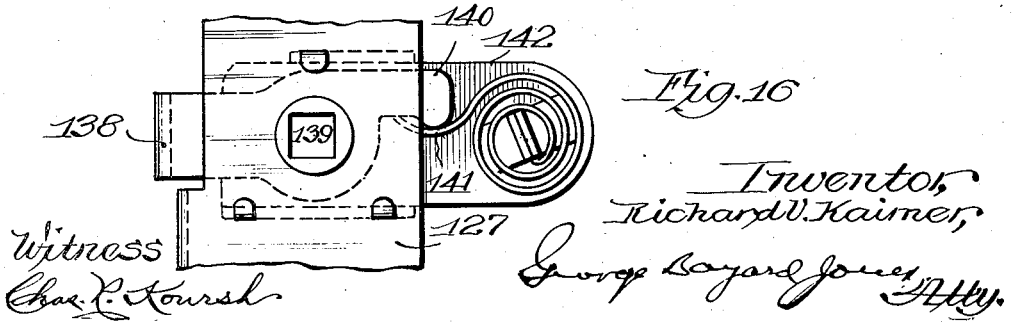

May 16, 1933.  R. V. KAIMER  1,909,361
LATCH FOR AUTOMOBILE DOORS
Filed Jan. 23, 1928  6 Sheets-Sheet 6
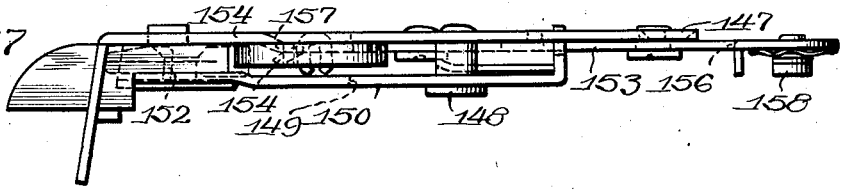
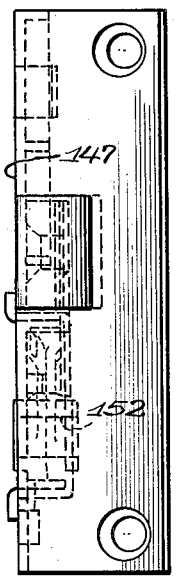
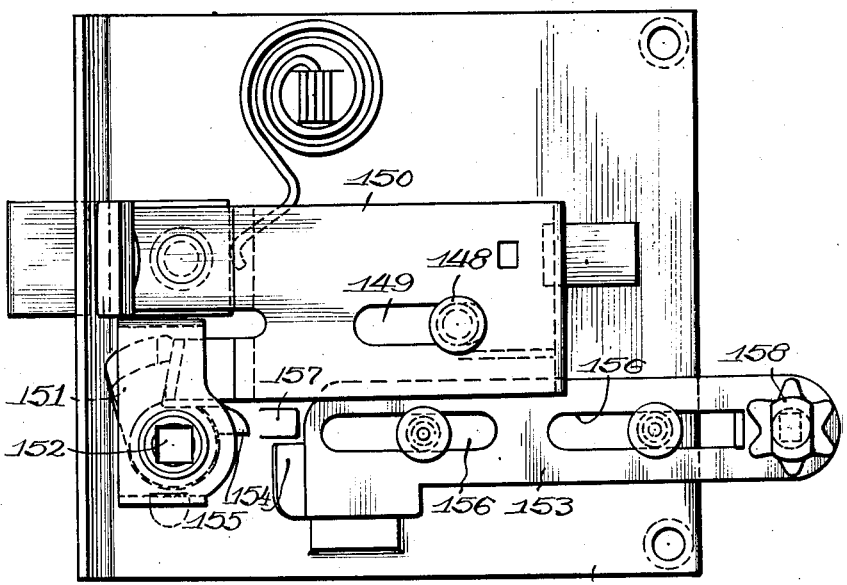
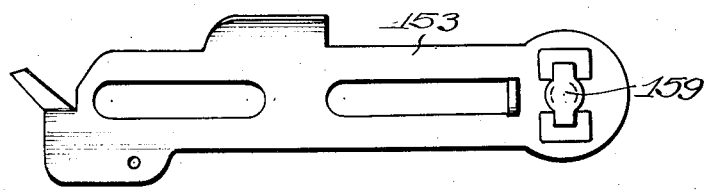

Patented May 16, 1933

1,909,361

UNITED STATES PATENT OFFICE

RICHARD V. KAIMER, OF NEW HAVEN, CONNECTICUT, ASSIGNOR, BY MESNE ASSIGNMENTS, TO C. COWLES & COMPANY, OF NEW HAVEN, CONNECTICUT, A CORPORATION OF CONNECTICUT

LATCH FOR AUTOMOBILE DOORS

Application filed January 23, 1928. Serial No. 248,669.

My invention relates to improvements in latches for automobile doors.

One object of the invention is to provide a simple but rugged construction whereby the latch bolt may be held to the case plate and guided on it in its movement without the usual cover plate, thus insuring a thin structure, well adapted to fit in the narrow space available in an automobile door.

A contributory object is to provide the case plate with a slot which receives a rivet secured to the latch bolt, or vice versa, the head of the rivet holding the latch bolt to the case plate but permitting it to slide back and forth thereon.

Other objects are directed to structural features which adapt the latch structure to closed cars which have a door post of minimum size, thus permitting the glass to have a maximum width to afford a wide range of vision.

In the accompanying drawings I have illustrated several embodiments of my invention.

Fig. 1 is an elevation of a latch structure of the remote control type,

Fig. 2 is a bottom view thereof,

Fig. 3 is a sectional view on the line 3—3 of Fig. 1,

Fig. 4 is an elevation on a smaller scale, of the side opposite that shown in Fig. 1, Fig. 5 is a section on the line 5—5, of Fig. 1, Fig. 6 is an elevation of a modified form of latch mechanism, Fig. 7 is a top plan view thereof, Fig. 8 is a front elevation on a smaller scale, Fig. 9 is an elevation of a further modification, Fig. 10 is a top plan view thereof, Fig. 11 is an elevation of certain details, Fig. 12 is an elevation of an additional modification, Fig. 13 is a top plan view thereof, Fig. 14 is an elevation of a further modification, Fig. 15 is a top plan view thereof, Fig. 16 is an elevation of certain details, Fig. 17 is a top plan view of a further modification, Fig. 18 is an elevation thereof, Fig. 19 is an end view thereof, Fig. 20 is an elevation of a modified link plate, and Fig. 21 is a bottom view thereof.

The latch structure shown in Figs. 1 to 5 inclusive, comprises the usual case plate 1, the front end of which is bent nearly at a right angle thereto, forming an extension 2. The latch bolt 3 has an enlarged bevelled head 4, the latter sliding back and forth in an opening in said extension 2.

The rear end of the latch bolt is guided between a pair of guides 5, struck up from the metal of the case plate. The latch bolt carries a rivet 6 having the usual enlargement or head thereon. The rivet passes through a slot 7 in the case plate, the head serving to lock the latch bolt to the case plate and also to assist in guiding it in its back and forth movement. By the provision of this interlocking arrangement the usual cover plate may be dispensed with, thereby reducing the manufacturing cost materially and providing a structure which is equally effective, reliable and rugged.

The latch bolt is provided with the usual extension or arm 8, the end of which is engaged by the usual roll-back 9 having a square opening 10 therethrough to receive the horizontal shaft (not shown) which carries the outside handle. The roll-back is enclosed in a sheet metal housing 11 having a pair of ears 12 bent at right angles thereto at the top and bottom and passing through openings in the case plate and headed over to hold the parts together.

The latch bolt is normally held in its extreme forward position by the usual spring 13 which bears against the rear end of said latch bolt.

The latch bolt may be withdrawn by any suitable means. In the present instance a remote control arrangement is shown including a link plate 14 overlying the latch bolt and having a pair of slots 15 and 16 therein through which pass rivets 17, 18. The sliding plate rests on and slides back and forth on transverse strips of metal or raised bosses 19, 20 on the latch bolt, whereby said sliding plate is spaced somewhat from said latch bolt. The rivets 17, 18 pass through said transverse strips as shown particularly in Fig. 2 and hold the parts together. A washer surrounds the rivet 17 and is engaged by a helical spring 21 which presses it against said sliding plate 14.

The forward end of said sliding plate has a projection 22 arranged to be moved under a locking arm 23, which turns with the roll-back 9, when the sliding plate is moved forward as far as possible to prevent rotation of the horizontal shaft which passes through the square opening 10, and thus locks the door against unauthorized actuation from the outside. When the sliding plate 14 is in the extreme limit of the relative movement permitted by the slots 15 and 16, as shown in Fig. 1, it may then be drawn rearwardly and will move the latch bolt with it, against the action of the spring 13. This rearward movement may be caused by a link 24 arranged to fit over the rivet 25 and locked thereon by a turning movement which is well understood with remote controls.

A modified form of latch structure is shown in Figs. 6 and 7 in which the case plate 26 is bent substantially at right angles at one end to form a transverse plate 27 connecting with an additional extension plate 28 which is substantially parallel to the main plate, thus forming roughly a U structure with one side longer than the other.

The latch bolt 29 has the usual enlarged bevelled end, the portion to the rear thereof being of reduced thickness as at 30. The latch bolt carries a rivet 31 which slides in a slot 32 as in the form previously described.

Guides 33 and 34 are struck up from the metal and guide the rear end of said latch bolt in a manner somewhat similar to the first form described. The usual spring 35 normally maintains the latch bolt in forward position. It is drawn rearwardly by a suitable remote control device connected to the sliding plate 36, the latter being secured to the latch bolt 30 by rivets 37, 38, passing through slots 39, 40 respectively in said sliding plate. The latch bolt has a downward projection 41, arranged to be retracted by the roll-back 42, the latter being mounted on a short square shaft 43 mounted to turn in the case plate 26.

The U shaped member or yoke 44 is arranged with one end over the square shaft 43, the other end having a reduced portion 45 forming a hub and being received in an opening in the plate 28. A square shaft and an outside handle (not shown) pass through an opening in the hub 45 and permit the latch bolt to be withdrawn by operating the outside handle in a well known manner. The yoke 44 moves up and down during the operation of the outside handle but clears the plate 27, the latter being cut away to avoid interference as shown in Figs. 6 and 8. With this yoke arrangement it is possible to provide a door post of minimum thickness whereby the vertically slidable glass panel may extend forwardly beyond the axis of rotation of the square shaft 43 and the outside handle. If the shaft on which the handle is mounted extended through the door to the roll-back 42, the glass would have to be correspondingly reduced in width.

In order to lock the door against unauthorized opening by means of the outside handle, a locking plate 46 is arranged to be moved up and down by means of a manually operable spindle 47, shown in part in Fig. 6, the upper end of which is within convenient reach of the operator. This locking plate is guided in its up and down movements by guides 48 struck up from the metal, at the upper and the lower ends thereof. It is also held to the case plate 26 by a pair of rivets 49 passing through slots 50 in said case plate and having enlarged heads to secure the parts together. Only the upper rivet and slot is seen in Fig. 6.

The lower forward corner 51 of the locking plate 46 constitutes a stop which, when in the position shown in Fig. 6, is cleared by the roll-back 42 during its rotation but when the locking plate is depressed said stop 51 is projected into the path of said roll-back and prevents the door from being opened by means of the outside handle. The upper edge of the plate 36 has a bevelled or cam surface 52 which, when the latch bolt is drawn rearwardly by the remote control device, engages a projection 53 on the sliding plate 46 and thus raises the latter, restoring the parts to normal position. This restoration occurs whenever the door is opened from the inside and provided that the locking plate has previously been depressed.

A spring 54 is riveted or otherwise secured to the case plate 26 and has a projection 55 stamped in the free end thereof arranged to snap into a recess (not shown) in the locking plate 46 to hold the latter in uppermost position. This spring also presses the lock against the case plate in all positions of the former and prevents rattling.

In Figs. 9, 10 and 11, I have illustrated another form of latch mechanism in which the usual bevelled latch bolt head 60 is shown, the latter in this case being preferably welded and riveted at 61 to a plate 62, constituting the main body of the latch bolt. This latch bolt is provided with a rivet 63 sliding in a slot 64 in the case plate 65, as in the previously described types, and the rear end thereof is bent against said case plate at 66 and slides thereon, the main body of the latch bolt plate being spaced from the case plate providing a clearance between the two. The bent over rear end 66 has a projecting portion 67 which slides in the slot 68 in said case plate and further guides the latch bolt in its back and forth movement. Said latch bolt is drawn rearwardly by a pivoted lever 69 having a suitable handle (not shown) at the upper end thereof and pivoted at its lower end on a stud 70. Said lever passes between the rear part of the latch bolt 62 and the case plate 65 and bears against the turned over portion 66, thereby causing the latch bolt to be drawn rearwardly when the lever is swung to the rear against the action of the spring 71. Another spring 72 is mounted on the case plate and bears against a struck up lug 73 on the latch bolt plate 62, thereby normally retaining the latch bolt in its extreme forward position.

The latch body may also be moved rearwardly by a roll-back 74, the upper end of which is extended and normally bears against a stop 75, struck up from the metal of the case plate. Said roll-back engages a bent up extension 76 on the latch bolt. A strip of metal 77 is secured to the latch bolt plate 62, preferably by welding at 78. Said strip slides between the roll-back 74 and the case plate and not only acts as a spacer but prevents rocking of said latch bolt plate.

The roll-back 74 turns about a stud 79 secured to the case plate and is integral with a U shaped yoke 80 shown more particularly in Figs. 10 and 11. The free end of said yoke is engaged and reinforced by an additional plate riveted or welded thereto as shown in Fig. 10 with a square opening 81 therethrough to receive the shaft on which the outside handle is mounted. As shown in Fig. 11, said end also has a locking projection 82 arranged to be engaged by a pivoted locking pawl 83 which latter may be controlled by a suitable lock and key mechanism whereby the door may be locked or unlocked from outside the car at will.

In order to lock the door from the inside of the car, a locking lever 84 is pivoted to the case plate by the rivet 85, its forward end having a bracket 86 riveted thereto at 87 and carrying a vertical push rod 88, the upper end of which is within convenient reach of the occupant of the car. By depressing said push rod the locking lever is rocked about its pivot and a projection 89 on the forward end thereof is lowered into the path of movement of the upper end of the roll-back 74 thereby preventing the door from being opened from the outside. A small projection 90 is pressed from the forward end of the locking lever and arranged to snap into a recess 91 in the case plate when said locking lever is in unlocking position, being yieldingly pressed against the case plate by a spring plate 92 held on a washer 93 on the rivet 85.

Assuming the door to be locked, as in Fig. 9, and that the occupant enters the car through one of the other doors, the actuation of the pivoted lever 69 for the purpose of withdrawing the latch bolt automatically restores the locking mechanism to normal position. This is accomplished by an inclined or cam surface 94 near the rear of the locking lever which is engaged by a pin 95 on the pivoted lever 69.

In Figs. 12 and 13 another form of locking mechanism is illustrated in which the bevelled end of the latch bolt 100 is formed preferably as a separate piece and riveted or welded at 101 to the plate 102, constituting the main body of the latch bolt. Said plate carries a rivet 103 sliding in a slot 104 in the case plate 105 as in the previous cases. The rear end of said latch plate is bent down as in the previous instance and has an extension 106 sliding within a slot 107. Said plate 102 is spaced from the case plate and prevented from rocking by a rivet 108 secured to said case plate. The usual spring 109 engages a struck up lug 110 on the plate 102.

The latch bolt is drawn rearwardly by a remote control device connected to the slotted bar 111 and transmits motion to said latch bolt through the rivets 112. The forward end of said bar has a projection 113 with an inclined surface or cam 114 the latter engaging a projection 115 on the vertically movable locking plate 116 to lift the latter. Said plate carries a pair of rivets 117 sliding in slots 118 in the case plate. Said locking plate is held in uppermost position by a spring strip 119 as in the case previously described. Said locking plate has a projection 120 which, when lowered, serves to obstruct the normal movement of the roll-back 121, the latter having a yoke 122 adapted to receive the shaft carrying the outside handle as in the previously described forms.

In the modified form of latch mechanism shown in Figs. 14, 15 and 16 the case plate 125 has a transverse front extension 126 and a rear extension 127 as in one of the earlier forms described and the latch bolt head 128 is also riveted or welded to the plate 129, the latter having a rivet 130 sliding in a slot 131 for the purpose previously described. A rear edge of the plate 129 is turned down at 132 to form a short foot which slides on the case plate and spaces the latch bolt plate 129 from the case plate. A similar bent down foot 133 serves a similar purpose. The rear of said latch bolt plate is bent downwardly at 134 and projects rearwardly in the form of an extension 135 which is guided between ears 136 struck up from the case plate. The roll-back 137 engages the foot 133 to withdraw the bolt when the yoke 138 is turned by the usual outside handle, the latter passing through the usual square opening 139. Said yoke is extended rearwardly at 140 and engaged by a spring 141 mounted on a plate 142 for holding it in normal position.

The locking lever 143 is pivotally mounted near the top of the case plate and normally impelled by the spring 144 to the locking position in which it is shown, for the purpose of obstructing the roll-back. Said lever is moved to unlocking position by turning the cam 145 about a quarter turn by rotating the hollow shaft 146 by means of a suitable handle inside the car.

In Figs. 17, 18 and 19, the case plate 147 has a rivet 148 secured thereto, the latter passing through a slot 149 in the latch bolt body 150. In other words, the relative arrangement of the rivet and slot are reversed in this form, although the same arrangement may be employed as in the previous forms described. The roll-back 151 is turned by a horizontal shaft in the square opening 152 and the bolt is also withdrawn from inside the car by a remote control device operating the link plate 153. This latter is a combination link plate and locking shoe having a forward extension 154 arranged to be engaged by a locking dog 155 which turns with the roll-back 151. The locking device is therefore operated by manipulation of the remote control, the slots 156 in said link plate being sufficiently long to permit the necessary additional forward movement.

When this locking device is not desired, a stop 157 may be struck up from the case plate to limit the forward movement of the link plate to approximately the position shown in Fig. 18.

The rear end of said link plate is provided with the usual rivet 158, which, however, may be struck up from the metal.

Figs. 20 and 21 show such a modified rivet, the link plate being otherwise the same, as indicated by the same reference characters. The metal at the rear is struck up to form an enlargement or head 159, over which the end of the link is fitted and turned as in the prior practice.

This integral rivet construction may, of course, be used in connection with the other forms of latch mechanisms shown and described herein, and the main rivet for holding the latch bolt body to the case plate may be mounted in said case plate and pass through a slot in the latch bolt body in said previously described latch mechanisms, as well as in Figs. 17, 18 and 19 if desired. This arrangement is desirable in cases where there is insufficient clearance between the lock board and the case plate to permit the head of the rivet to project through and slide in a slot in said case plate.

What I claim is:

1. A vehicle door latch comprising a case plate having an end extension at an angle thereto, a roll-back pivotally mounted on said case plate, a housing therefor, a latch bolt having a head guided in an opening in said extension, and a rivet secured to said latch bolt, passing through a slot in said case plate and having a head engaging said case plate to hold said latch bolt to said plate while permitting reciprocation thereof, and a plate slidably mounted on said latch plate and having an extension offset from the plane of said plate toward said case plate whereby it may enter said housing and obstruct said roll-back when moved toward said end extension.

2. A vehicle door latch comprising a case plate having an end extension at an angle thereto, a latch bolt having a head guided in an opening in said extension, a rivet secured to said latch bolt, passing through a slot in said case plate and having a head engaging said case plate to hold said latch bolt to said plate while permitting reciprocation thereof, a plate having a pin and slot connection with said latch bolt for withdrawing the same, a roll-back for withdrawing said latch plate and a yoke having one end secured to said roll-back and having the other end associated with a handle outside of the vehicle.

3. A vehicle door latch comprising a case plate having an end extension at an angle thereto, a latch bolt having a head guided in an opening in said extension and having a portion to the rear of said head of reduced thickness and spaced from said case plate to provide a clearance, a portion of said latch bolt being bent inwardly to slide on said face plate, and a rivet secured to said latch bolt, passing through a slot in said case plate and having a head engaging said case plate to hold said latch bolt to said plate while permitting reciprocation thereof.

4. A vehicle door latch comprising a case plate having an end extension at an angle thereto, a latch bolt having a head guided in an opening in said extension and having a portion to the rear of said head of reduced thickness and spaced from said case plate to provide a clearance, a portion of said latch bolt being bent inwardly to slide on said face plate, a rivet secured to said latch bolt, passing through a slot in said case plate and having a head engaging said case plate to hold said latch bolt to said plate while permitting reciprocation thereof, a roll-back for retracting said latch bolt from the outside of the vehicle and a vertically movable plate mounted in said clearance space for locking said roll-back.

5. A vehicle door latch comprising a case plate having an end extension at an angle thereto, a latch bolt having a head guided in an opening in said extension, a rivet secured to said latch bolt, passing through a slot in said case plate and having a head engaging said case plate to hold said latch bolt to said plate while permitting reciprocation thereof, a plate having a pin and slot connection with said latch bolt for withdrawing the same, a roll-back for withdrawing said latch plate and a yoke having one end secured to said roll-back and having the other end associated with a handle outside of the vehicle, said case plate having its end extending backward substantially parallel to itself to form a bearing for said other end.

In testimony whereof, I have subscribed my name.

RICHARD V. KAIMER.